United States Patent
Gary et al.

(10) Patent No.: US 9,604,201 B2
(45) Date of Patent: Mar. 28, 2017

(54) METHOD OF TREATMENT FOR A CATALYTIC REACTOR

(71) Applicant: L'Air Liquide, Societe Anonyme pour l'Etude et l'Exploitation des Procedes Georges Claude, Paris (FR)

(72) Inventors: Daniel Gary, Montigny le Bretonneux (FR); Raphael Faure, Villebon-sur-Yvette (FR); Olivier Debellemaniere, Bures sur Yvette (FR); Angelo Vaccari, Bologna (IT); Giuseppe Brenna, Rionero in Vulture (IT)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 14/776,033

(22) PCT Filed: Mar. 5, 2014

(86) PCT No.: PCT/FR2014/050496
§ 371 (c)(1),
(2) Date: Sep. 14, 2015

(87) PCT Pub. No.: WO2014/140455
PCT Pub. Date: Sep. 18, 2014

(65) Prior Publication Data
US 2016/0023194 A1    Jan. 28, 2016

(30) Foreign Application Priority Data
Mar. 14, 2013 (FR) ...................................... 13 52266

(51) Int. Cl.
| | | |
|---|---|---|
| *B82Y 30/00* | (2011.01) | |
| *B01J 23/94* | (2006.01) | |
| *B01J 8/00* | (2006.01) | |
| *B01J 23/26* | (2006.01) | |
| *B01J 23/28* | (2006.01) | |
| *B01J 23/72* | (2006.01) | |
| *B01J 23/745* | (2006.01) | |
| *B01J 23/75* | (2006.01) | |
| *B01J 23/755* | (2006.01) | |
| *B01J 33/00* | (2006.01) | |
| *B01J 38/14* | (2006.01) | |

(52) U.S. Cl.
CPC ............. *B01J 23/94* (2013.01); *B01J 8/0035* (2013.01); *B01J 23/26* (2013.01); *B01J 23/28* (2013.01); *B01J 23/72* (2013.01); *B01J 23/745* (2013.01); *B01J 23/75* (2013.01); *B01J 23/755* (2013.01); *B01J 33/00* (2013.01); *B01J 38/14* (2013.01); *B01J 2219/00263* (2013.01); *B01J 2219/00265* (2013.01)

(58) Field of Classification Search
CPC ................................ B82Y 30/00; C01B 31/02
USPC ....................................................... 423/447.3
See application file for complete search history.

(56) References Cited

U.S. PATENT DOCUMENTS 3,838,066 A    9/1974  Lovell
4,090,980 A    5/1978  Carter et al.

FOREIGN PATENT DOCUMENTS

| FR | 2 268 859 | 11/1975 |
| GB | 1 508 021 | 4/1978 |
| GB | 2 193 114 | 2/1988 |

OTHER PUBLICATIONS

International Search Report and Written Opinion for PCT/FR2014/050496, mailed Jun. 17, 2014.
French Search Report and Written Opinion for FR 1 352 266, mailed Oct. 28, 2013.

*Primary Examiner* — Edward Johnson
(74) *Attorney, Agent, or Firm* — Christopher J. Cronin

(57) ABSTRACT

Process for treating a catalytic reactor comprising a catalyst bed that includes the successive steps of passivating the catalytic reactor leading to the production of an oxidation layer at the surface of the active sites of the catalyst bed, opening the reactor, and skimming at least one portion of the catalyst bed.

13 Claims, 1 Drawing Sheet

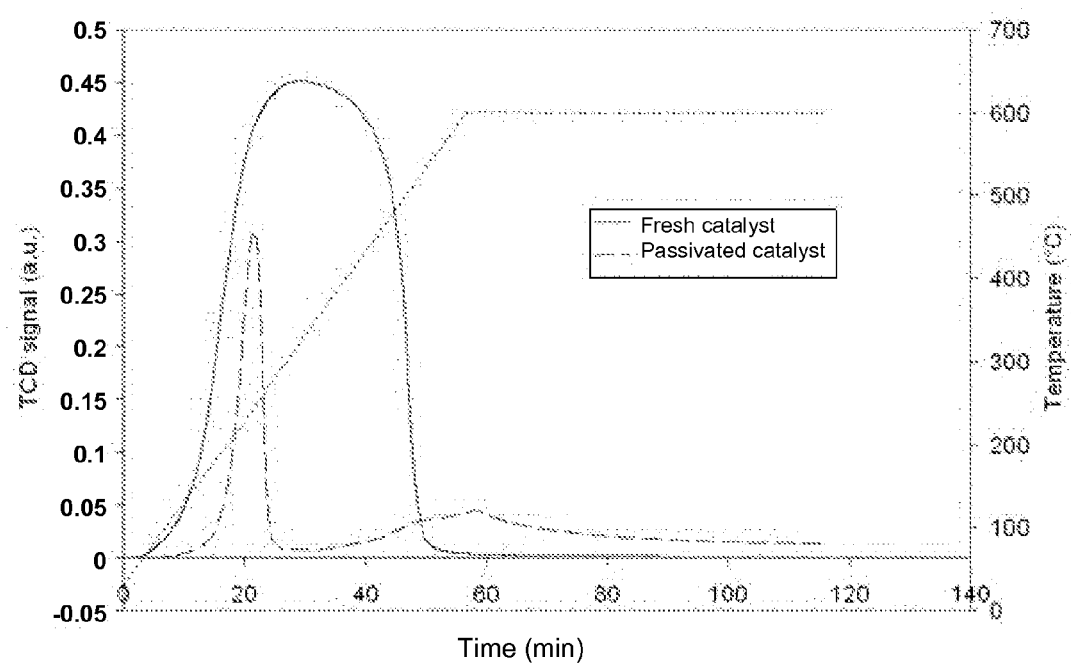

METHOD OF TREATMENT FOR A CATALYTIC REACTOR

CROSS-REFERENCE TO RELATED APPLICATIONS

This application is a §371 of International PCT Application PCT/FR2014/050496, filed Mar. 5, 2014, which claims §119(a) foreign priority to French patent application 1352266, filed Mar. 14, 2013.

BACKGROUND

Field of the Invention

The present invention relates to the process for treating a catalytic reactor.

Related Art

The productivity of the plant is essentially determined by the optimization of the design thereof and of the operating costs.

As a general rule, in chemical units assisted by catalytic processes, the operation of the reactors is a key point. Indeed, many plant incidents are caused by the reactors and the catalysts.

The catalytic materials may greatly suffer from the variation of certain parameters. By way of example, the increase in the temperature may lead to sintering of catalytic sites and their supports. Similarly, a modification of the composition of the gas stream may lead to the presence of "poisonous elements" that may themselves lead to a deactivation of the catalyst.

When the catalysts do not carry out their role, incidents occur and lead generally to operating problems of the plant and irremediably the plant must be shut down for maintenance.

The replacement of a catalyst represents a cost that corresponds on the one hand to the price of the catalyst itself and on the other hand to the sanctions applied by the ultimate customer, who does not receive the products required for their own application during the unforeseen replacement phase.

In certain cases, it is possible to evaluate what fraction of the catalyst must be replaced. Indicators such as temperature measurements may reflect the portion of the catalyst bed which is no longer active. In this case, the replacement of the catalyst may be optimized and it is possible to carry out the skimming and replacement of a portion of the catalyst bed.

However, the skimming must be carried out carefully in order to:
  avoid any problem such as the deterioration of the portion of the catalyst bed which is retained by violent oxidation in contact with the air and/or moisture capable of penetrating after the reactor is opened, and in order to
  enable the operators to work in complete safety. Indeed, the operators may potentially be confronted with a sudden heating after opening the catalytic reactor due to oxidation with the air.

Starting from this, one problem that is faced is to provide an improved process for treating a catalytic reactor.

SUMMARY OF THE INVENTION

One solution of the present invention is a process for treating a catalytic reactor comprising a catalyst bed that successively comprises:

a) a step of passivation resulting in the production of an oxidation layer at the surface of the active sites of the catalyst bed,
b) a step of opening the reactor, and
c) a step of skimming at least one portion of the catalyst bed.

The term "passivation" is understood to mean a step of very superficial oxidation of the catalytic material.

Depending on the case, the process according to the invention may have one or more of the following features:
  the oxidation layer has a thickness of between 0.3 and 10 nm, preferably of between 0.3 and 3 nm;
  the passivation step comprises:
    i—a sub-step of introducing into the catalytic reactor an inert gas comprising an amount of oxidizer of between 50 and 100 ppm,
    ii—the repetition of the introduction sub-step (i) by increasing the amount of oxidizer by a factor of 2 to 10, preferably of 4 to 8 in the stream of inert gas until the oxygen content within the reactor is equal to the oxygen content in the atmosphere;
  the passivation step is carried out at a temperature of less than 200° C., preferably of less than 100° C.;
  the passivation step is carried out at a pressure of less than 10 atm, preferably of less than 5 atm;
  the introduction sub-step results in the oxidation of the surface of the metal particles present in the catalyst bed. It should be noted that the surface of the particles corresponds to a surface layer of nanoscale thickness. Indeed, the oxidation during the introduction sub-step does not diffuse to the centre of the catalyst bed;
  during the passivation step, a monitoring of the temperature of the catalyst bed is carried out;
  during the passivation step, a heat front is observed and the repetition of the introduction sub-step is carried out when the heat front breaks through the outlet orifice of the catalytic reactor;
  the catalytic reactor is a reactor based on copper, nickel, cobalt, iron, molybdenum, chromium, etc.;
  the catalytic reactor is a reactor used for the synthesis of methanol, the hydrogenation of carbon dioxide, the hydrogenation of carbon monoxide, the methanation reaction, the steam or $CO_2$ reforming of methane, the steam reforming of alcohol (methanol, ethanol, etc.).

BRIEF DESCRIPTION OF THE FIGURES

FIG. 1 is a plot of temperature programmed reduction for both a passivated sample according to the invention and a non-passivated sample.

DETAILED DESCRIPTION OF THE INVENTION

Within the context of the invention, the expression "inert gas" is understood to mean a gas that is inert with respect to the active sites of the catalyst bed; this gas may be nitrogen or argon.

After opening the reactor (step b), the reactor is depressurized to atmospheric pressure and cooled to ambient temperature by a flow of inert gas, preferably nitrogen. Next, the catalytic reactor is opened while being flushed by said inert gas. However, during the opening, air may enter the catalytic reactor, and it is customary to measure from 0.5% to 5% oxygen at the surface of the catalytic bed. In the absence of the passivation step carried out according to the invention before the step of opening the reactor, oxidation of the catalyst with sudden heating would be observed, leading to an irreversible deactivation of the catalyst bed. Indeed, the heating will promote the sintering of the metal. It should be noted that the rate of deactivation is dependent on the temperature range and on the nature of the metal and the melting point thereof. The rate of deactivation also depends on the state of the microstructure of the catalyst.

The passivation step according to the invention makes it possible to keep the part of the catalyst considered to still be active constant during the opening of the catalyst.

The solution proposed by the invention will now be described in detail by means of two procedures given by way of example.

According to a first procedure, applicable in particular to catalysts that are weakly loaded with metals (up to 25% by weight), the passivation step is carried out by an inert gas, for example nitrogen, and an oxidizer, for example $O_2$ or $CO_2$, introduced into the inert gas. The passivation step is carried out at a temperature as low as possible, in general at a temperature of less than 100° C., preferably at a temperature of less than 50° C. The amount of oxidizer in the inert gas should be as low as possible. Since the oxidation reaction is exothermic, a small amount of oxidizer makes it possible to minimize the temperature rise. The amount of oxidizer at the start of the passivation step should be of the order of a few tens of ppm, preferably between 50 and 100 ppm. Ideally, monitoring of the temperature of the catalyst bed makes it possible to verify that no hot spot phenomenon occurs. The duration of the passivation step depends on the size of the shell. If a temperature increase is detected (rise detected between 1° C. and 5° C.) due to the oxidation reaction, it is possible to use this temperature measurement as an indicator of the progression of the reaction. Also, during the passivation step, the breakthrough of the heat front at the outlet of the catalytic reactor is observed. Once the breakthrough of the heat front is observed, the introduction of inert gas is repeated by increasing the amount of oxidizer in the stream of inert gas until the composition of the outside atmosphere is attained.

According to a second procedure applicable specifically to copper-based catalysts containing more than 40% by weight of copper, the passivation step is carried out by means of nitrogen flow comprising an oxygen concentration of around 50 ppm at ambient temperature and at atmospheric pressure. The passivation reaction was monitored by controlling the temperature. The breakthrough of the heat front at the outlet of the catalytic reactor is observed. Once the breakthrough of the heat front is observed, the introduction of inert gas is repeated by increasing the amount of oxidizer in the nitrogen stream. The oxygen content in the nitrogen stream is increased gradually from 100 ppm to 1000 ppm. If the temperature of the catalyst bed remains stable in the presence of a nitrogen stream comprising an oxygen content of 1000 ppm, it may be considered that the passivation step is finished. The catalytic reactor may then be opened after cooling to ambient temperature without risk of reoxidation.

A sample from the catalyst bed was characterized by temperature-programmed reduction (TPR) and observed by TEM (transmission electron microscopy) in order to reach a conclusion regarding the relevance of the passivation step (identification of the presence of the oxidation layer at the surface of the catalyst bed). The figure represents a first TPR signal obtained by means of a sample that has not undergone the passivation step according to the invention (solid-line curve) and a second TPR signal obtained by means of a sample that has undergone the passivation step according to the invention (dotted-line curve). It is then observed that the total reduction of the passivated sample is obtained rapidly (in less than 30 minutes) and at low temperature (200° C.) where as the reduction of the non-passivated sample requires more time (40 minutes) and more energy (400° C.).

The step of passivation before opening the catalytic reactor and skimming a portion of the bed is relevant for many metal catalysts based on Cu, Ni, Co, Fe, Cr, Mo, etc. used for example in the following processes:

Cu-based catalyst: synthesis of methanol, hydrogenation of $CO_2$, hydrogenation of CO;

Ni-based catalysts: reforming or pre-reforming reaction, methanation reaction, etc.;

Co- or Fe-based catalyst: Fischer-Tropsch process.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

What is claimed is:

1. A process for treating a catalytic reactor comprising a catalyst bed, comprising the sequential steps of:
 a) passivating the catalyst bed thereby resulting in production of an oxidation layer at a surface of active sites of the catalyst bed, said passivating step comprising the sub-steps of:
   i) introducing an inert gas into the catalytic reactor, the inert gas including an oxidizer at a concentration of between 50 and 100 ppm, and
   ii) observing the breakthrough of a heat front at an outlet of the catalyst reactor;
   iii) once the breakthrough of a heat front at an outlet of the catalyst reactor is observed, repeating sub-step (i)

with an increase of the concentration of the oxidizer in the inert gas by a factor of 2 to 10 until an oxygen concentration within the reactor is equal to an oxygen concentration in the atmosphere outside the reactor;

b) opening the reactor; and c) skimming at least one portion of the catalyst bed.

2. The process of claim 1, wherein performance of said process results in an oxidation layer thickness of between 0.3 and 10 nm, preferably of between 0.3 and 3 nm.

3. The process of claim 2, wherein performance of said process results in an oxidation layer thickness of between 0.3 and 3 nm.

4. The process of claim 1, wherein said step of passivating is carried out at a temperature of less than 200° C., preferably of less than 100° C.

5. The process of claim 4, wherein said step of passivating is carried out at a temperature of less than 100° C.

6. The process of claim 1, wherein said step of passivating is carried out at a pressure of less than 10 atm.

7. The process of claim 6, wherein said step of passivating is carried out at a pressure of less than 5 atm.

8. The process of claim 1, wherein said step of introducing the inert gas results in oxidation of a surface of metal particles present in the catalyst bed.

9. The process of claim 1, wherein during said step of passivating, a temperature of the catalyst bed is monitored.

10. The process of claim 9, wherein during said step of passivating, an outlet orifice of the catalytic reactor is observed for a heat front to break through and sub-step (ii) is performed when the heat front breaks through the outlet orifice.

11. The process of claim 1, wherein the catalytic reactor is a reactor based on copper, nickel, cobalt, iron, molybdenum or chromium.

12. The process of claim 1, wherein the catalytic reactor is a reactor used for synthesis of methanol, hydrogenation of carbon dioxide, hydrogenation of carbon monoxide, a methanation reaction, steam reforming of methane, $CO_2$ reforming of methane, or steam reforming of alcohol.

13. The process of claim 1, wherein the concentration of the oxidizer is increased by a factor of 4 to 8 in sub-step (ii).

* * * * *